Apr. 24, 1923.

H. P. HIMES

BEARING

Filed March 19, 1921  4 Sheets—Sheet 1

Witness:
G. L. Terna

Inventor
Howard P. Himes
By his Attorney

Apr. 24, 1923.
H. P. HIMES
BEARING
Filed March 19, 1921
1,452,603
4 Sheets-Sheet 2
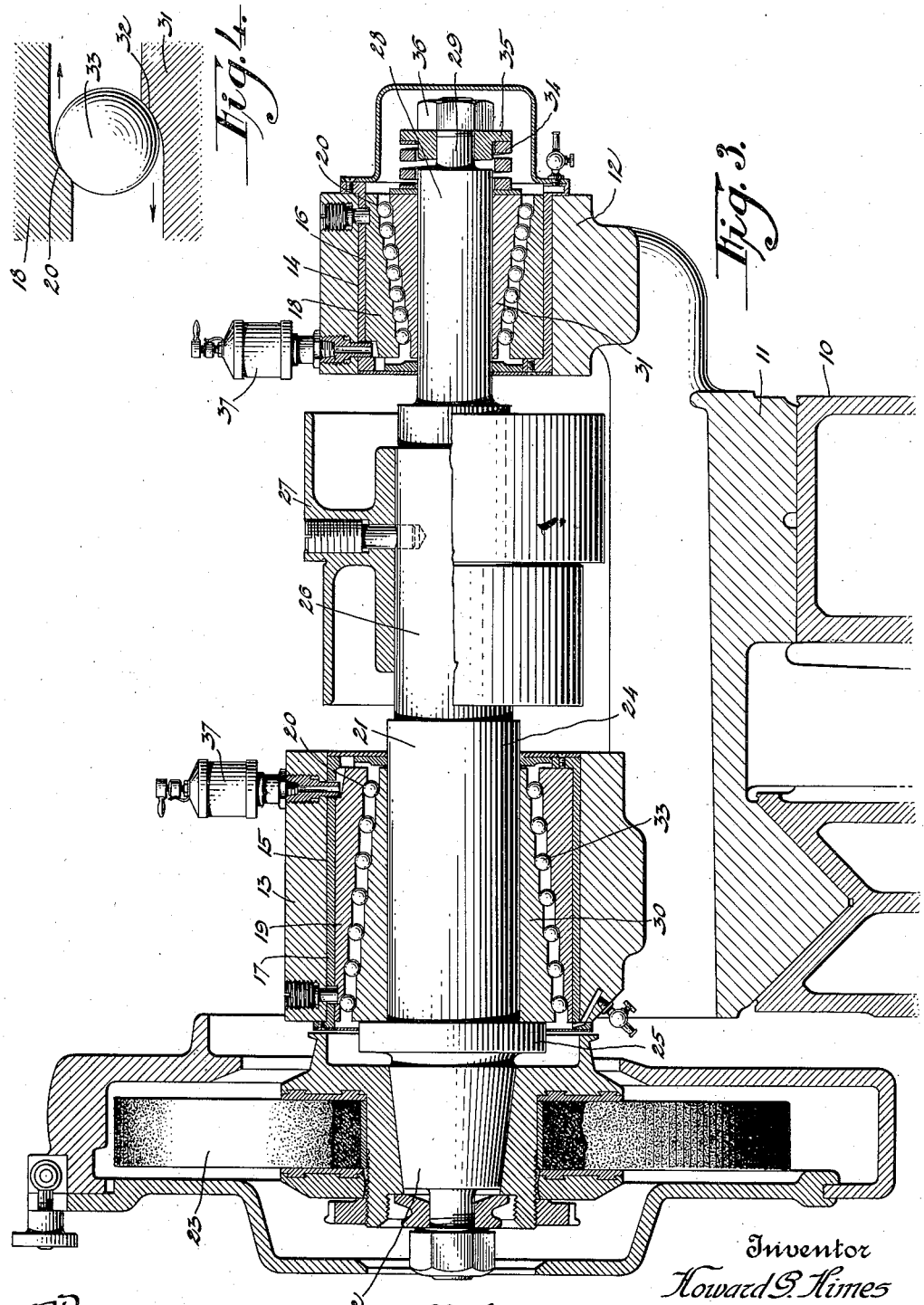

Apr. 24, 1923.  
H. P. HIMES  
BEARING  
Filed March 19, 1921  
1,452,603  
4 Sheets-Sheet 4

Witness:  
G. L. Terna

Inventor  
Howard P. Himes  
By his Attorney  
Lloyd B. Blackmore

Patented Apr. 24, 1923.

1,452,603

UNITED STATES PATENT OFFICE.

HOWARD P. HIMES, OF DETROIT, MICHIGAN.

BEARING.

Application filed March 19, 1921. Serial No. 453,667.

*To all whom it may concern:*

Be it known that I, HOWARD P. HIMES, a citizen of the United States, and a resident of Detroit, county of Wayne, and State of Michigan, have invented certain new and useful Improvements in Bearings, of which the following is a full, clear, concise, and exact description, such as will enable others skilled in the art to which the invention relates to make and use the same, reference being made therein to the accompanying drawings, which form a part of this specification.

The invention relates to improvements in bearings, as described in the present specification and illustrated in the accompanying drawings that form part of the same.

The invention consists essentially of the novel arrangement and construction of parts as hereinafter more fully set forth.

The objects of the invention are to devise a bearing which will be particularly adapted for high speed service, which will be comparatively simple and inexpensive in construction, and which will automatically adjust itself to take up any play and properly seat the bearing surfaces, whereby a maximum load may be carried at high speeds with a minimum of friction and without liability of seizure or chatter.

In the drawings—

Figure 3 is an enlarged longitudinal sectional view of the grinding wheel spindle shown in Figure 1.

Figure 4 is an enlarged detail sectional view of two mating bearing surfaces with an anti-friction ball therebetween.

Figure 1:
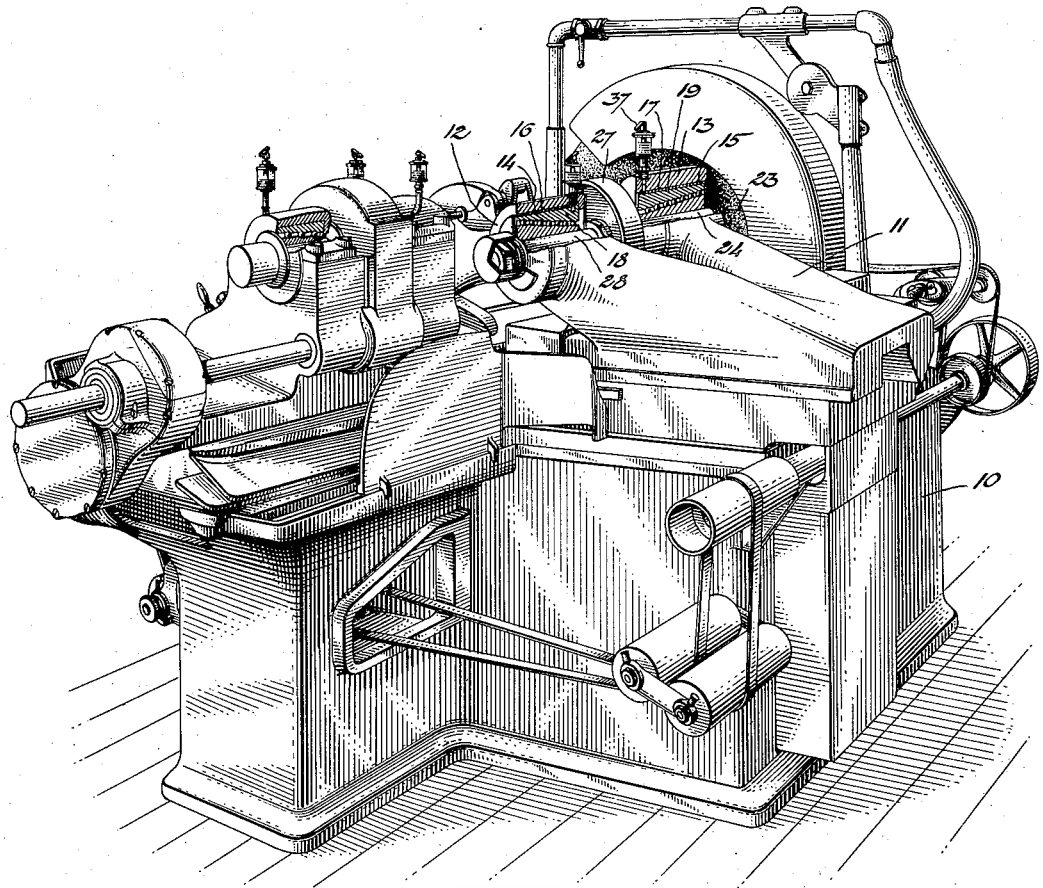
Figure 1 is a perspective view of a grinding machine with certain of the bearings thereof shown in section.

The bearings, as hereinafter fully described, are particularly applicable to machines where parts are running at high speed, or where excessive loads occur, as for instance in grinding or buffing machines, high speed motors, generators, turbines or the like; though it must be understood that the bearings are equally advantageous in eliminating friction in slow speed machines, such as milling machines, boring mills, lathes or the like, where a spindle or other rotating part is required to operate with accuracy.

It is customary with some machines of this type, more particularly the standard form of grinding machine, to make the bearings with sufficient play to permit of the expansion due to the heat generated by the high speed at which they are running, and naturally it requires considerable time and expense to keep these bearings in proper running condition, because if they are adjusted too tightly when cool and at rest, they will seize or burn when heated by their running, or if adjusted with too much play when cool, there is considerable vibration and chatter, and this is not only harmful to the machine in general, but also is very likely to affect the work done by the machine, and to be very dangerous, as such vibration and chatter, especially with grinding wheels, tends to cause the material of the wheel to fracture and explode due to the high centrifugal strains put thereupon, which require that the shaft and other revolving parts be run as true as possible.

Like numerals of reference indicate corresponding parts in each figure.

Referring to the drawings, and particularly Figures 1 to 4 inclusive, the numeral 10 indicates a grinding machine of standard type, having the grinder head 11 adjustably arranged thereon, and provided with the bearing supports 12 and 13, having the central bores 14 and 15 respectively. It will be understood that the said bores are made with extreme accuracy, as in fact are all the parts pertaining to the bearings as hereinafter described.

The bores 14 and 15 of the bearing supports 12 and 13 are fitted with suitable bushings 16 and 17, said bushings being further fitted with the multiple step ball bearing cups 18 and 19, each cup having the ball race 20 formed in the interior periphery thereof in step formation.

The numeral 21 indicates a grinder spindle having the tapered end 22 on which the grinding wheel 23 is suitably mounted. The spindle 21 extends through the bearing supports 12 and 13, and has the enlarged section 24 within the support 13, with the flange 25 at the end thereof adjacent the grinding wheel, and the mid-section 26, on which suitable drive pulleys 27 are suitably mounted, and the reduced section 28 within the bearing support 12, and the further reduced and threaded end 29.

The spindle 21, where it extends through the bearing supports, has the multiple step ball bearing cones 30 and 31 mounted thereon, the cone 30 being pressed or keyed to the section 24, and the cone 31 being slidably keyed or otherwise arranged on the section 28. The cones 30 and 31 are provided with the ball races 32 in step form and complementary with the ball races in the cups 18 and 19.

The cups 18 and 19 and the cones 31 and 30 have the ball bearings 33 arranged therein as customary in ball races, though it must be particularly noted, as shown in Figure 4, that the ball races on the cups and cones respectively are diametrically a sufficient distance apart to give ample space for the ball bearings, so that there is no possibility of seizing or binding in any way due to high temperatures, which might cause the cone to expand, but when the cone and cup are relatively moved in the direction indicated by the arrows in said Figure 1, the curved portion of the races will approach one another until the ball bearings rest thereupon in proper running position.

The reduced end 29 of the spindle 21 has the spiral spring 34 encircling the same and bearing against the cone 31, and the washer 35 retained on said spindle 36 by the nut threaded onto the correspondingly threaded end 29 of said arbor.

The spring 34 is constantly tending to move the cone 31 along on the arbor toward the cone 30, and thus close the ball races between the cones and the cups altogether. In this manner if the bearing heats up and expands the cones will not seize against the ball bearings and the complementary bearing cup races, but will retract from one another and from their respective cups sufficiently always to give the proper accommodation for the ball bearings, and withal the taper on the cup and cone races is so slight that the spindle and grinding wheel may be run at exceedingly high speed without chattering or in any manner causing the bearings to shift and permit of any play.

It will, of course, be understood that the bearings may be lubricated in any desired manner, such as by means of the oil cups 37.

Figure 2:
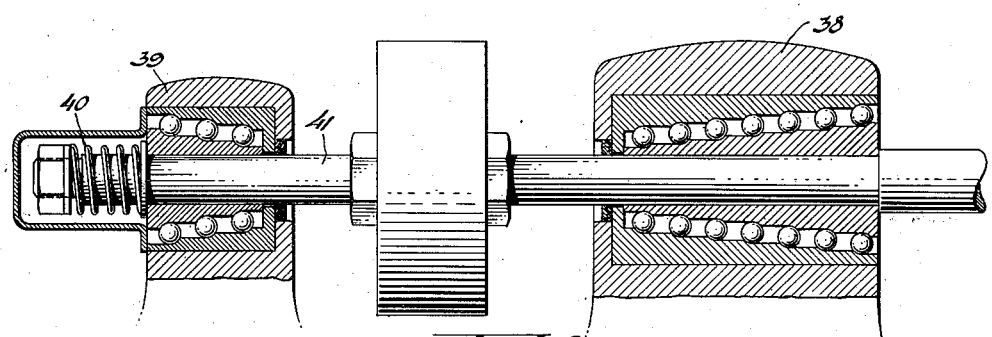
Figure 2 is an enlarged longitudinal sectional view of two of the bearings shown in the grinding machine, Figure 1.

Referring particularly to Figure 2, it will be readily understood that the bearings are substantially identical with those already described, though obviously designed for lighter work.

The bearing support 38 is of comparatively the same length, but of lesser diameter than those hereinbefore described, while the bearing 39 is considerably smaller, as also the spring 40 arranged on the end of the shaft 41 is somewhat lighter for automatically taking up any play which may occur due to expansion or contraction.

Figure 5:
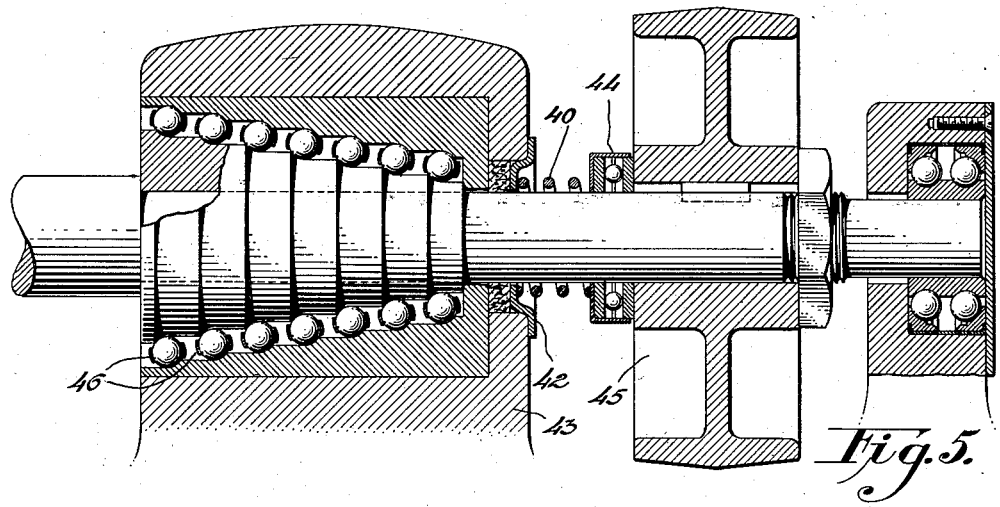
Figures 5, 6, 7, 8 and 9 are enlarged longitudinal sectional views of modified forms of bearing mountings.

In Figure 5 the take-up spring 40 is shown mounted between a washer 42 fitting against the bearing support 43 and the thrust bearing 44 next the pulley 45. The ball bearings are also shown assembled in cages 46.

Figure 6:
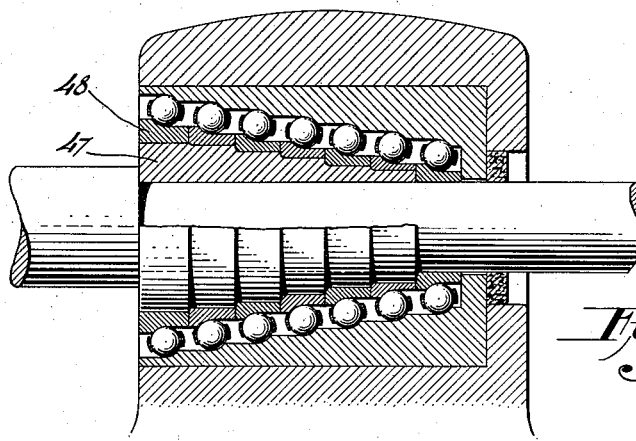

In Figure 6, the cone 47 is shown with the separate ball race rings 48 mounted thereon.

Figure 7:
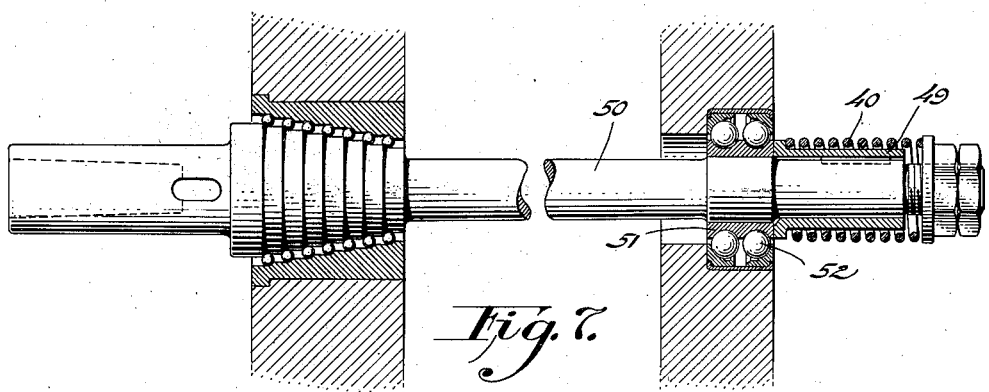

In Figure 7 the take-up spring 40 is mounted on a sleeve 49 slidably arranged on the end of the shaft 50 and bearing against the inner member 51 of the thrust bearing 52.

Figure 8:
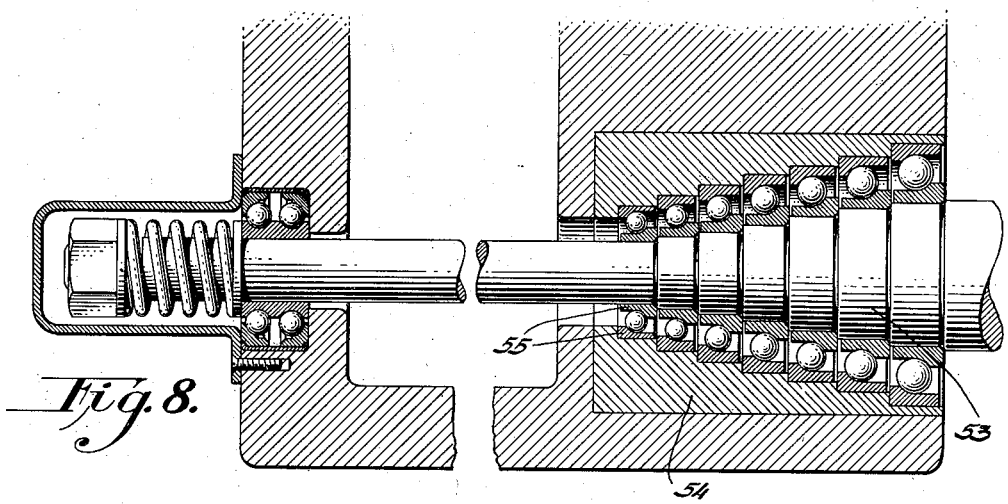

In Figure 8 both the cone 53 and the cup 54 are shown with the renewable ball race rings 55.

Figure 9:
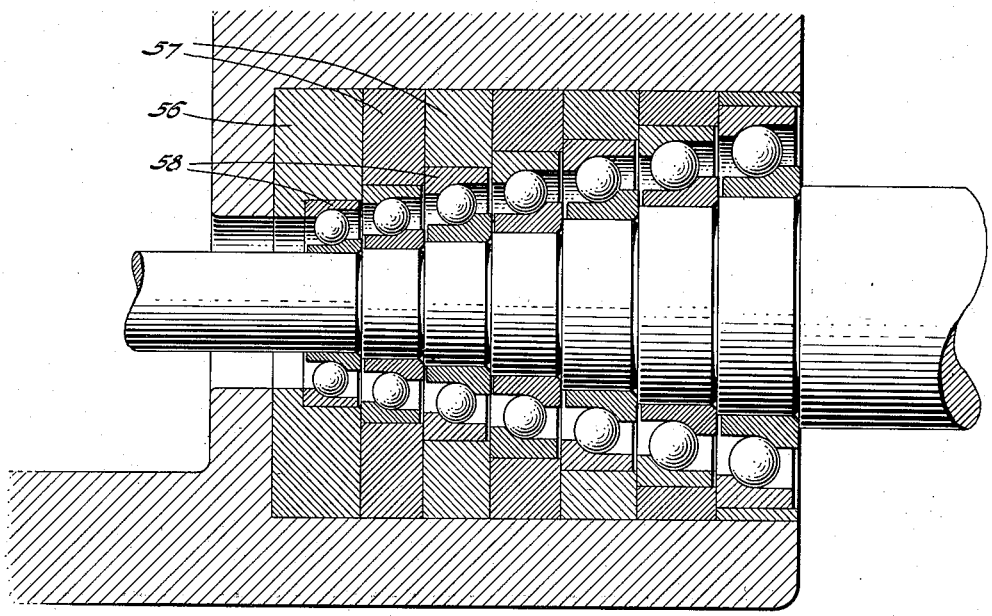

In Figure 9 the cup 56 is shown built up of sections 57. The said sections may further have the renewable ball races 58. In this manner a bearing of any size or number of steps may be readily assembled without requiring that the carefully heat treated and finished ball races be especially made for the required dimensions.

It will be understood that many modifications and arrangements of the various parts as described may be made by those skilled in the art without departing from the spirit of the invention.

What I claim is:

1. In a grinding machine or the like, a plurality of bearing supports, multi-stepped cup members having tapered ball races therein mounted in said supports, a wheel spindle having a cone member fixedly mounted toward one end thereof and a cone member slidably mounted toward the other end thereof, said cone members being complementary to said cup members, anti-friction ball bearings mounted between said cup and cone members and means to exert a resilient pressure to move said slidable cone upon said spindle.

2. In a grinding machine or the like, a plurality of bearing supports, multi-stepped cup members having tapered ball races therein mounted in said supports, a wheel spindle having a cone member fixedly mounted toward one end thereof and a cone member slidably mounted toward the other end thereof, said cone members being complementary to said cup members, anti-friction ball bearings mounted between said cup and cone members and a spring mounted on said spindle and exerting a constant pressure upon said slidable cone member.

3. In a grinding machine or the like, an arbor provided with means for attaching a grinding wheel thereto, a bearing for said arbor adjacent to the said means comprising a cone fixed to said arbor, said cone having a plurality of races, the successive races being of gradually increasing diameter from one end of the cone to the other, a cup having complementary races and sets of antifriction members in said races, and spring means carried by the arbor on the side of said bearing opposite to said first mentioned means adapted to force said cone resiliently into said cup.

In testimony whereof I affix my signature.

HOWARD P. HIMES.